US012795278B2

(12) United States Patent
Lee et al.

(10) Patent No.: US 12,795,278 B2
(45) Date of Patent: Nov. 10, 2026

(54) MICROPHONE MODULE WITH DRAINAGE STRUCTURE

(71) Applicant: Merry Electronics(Shenzhen) Co., Ltd., ShenZhen (CN)

(72) Inventors: Yueh-Kang Lee, Taichung (TW); Cheng Yuan Chan, Taichung (TW); Chao-Sen Chang, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 184 days.

(21) Appl. No.: 18/740,541

(22) Filed: Jun. 12, 2024

(65) Prior Publication Data

US 2025/0358560 A1 Nov. 20, 2025

(30) Foreign Application Priority Data

May 20, 2024 (TW) ................................ 113118604

(51) Int. Cl.
*H04R 1/08* (2006.01)
*H04R 1/04* (2006.01)
*H04R 1/02* (2006.01)

(52) U.S. Cl.
CPC ............... *H04R 1/086* (2013.01); *H04R 1/04* (2013.01); *H04R 1/021* (2013.01)

(58) Field of Classification Search
CPC . H04R 1/086; H04R 1/44; H04R 1/04; H04R 1/021; H04R 1/08; H04R 2201/003; H04R 2201/02
USPC ......................................... 381/322, 355, 189
See application file for complete search history.

(56) References Cited

U.S. PATENT DOCUMENTS 9,084,053 B2 * 7/2015 Parkins .................. H04R 1/086
2017/0006398 A1 * 1/2017 Jing ...................... H04R 3/005
2018/0081258 A1 * 3/2018 Clyne ...................... G06F 3/16
2021/0046425 A1 * 2/2021 Lee ...................... B01D 71/022
2023/0188879 A1 * 6/2023 Woo ...................... H05K 1/141 381/91
2024/0064460 A1 * 2/2024 Wang .................. H04R 1/2873

* cited by examiner

*Primary Examiner* — Norman Yu
(74) *Attorney, Agent, or Firm* — JCIPRNET

(57) ABSTRACT

Disclosed is a microphone module including a casing, a microphone, a drainage structure, and a waterproof membrane. The microphone is disposed in the casing. The drainage structure is disposed on the casing. The drainage structure includes a first channel and a second channel connected to each other. A first sound hole and a drainage hole of the first channel are exposed from the casing, and a second sound hole of the second channel corresponds to the microphone. A first normal line of the first sound hole is perpendicular to a second normal line of the second sound hole. The waterproof membrane is disposed on the casing and between the microphone and the second sound hole.

17 Claims, 9 Drawing Sheets

MICROPHONE MODULE WITH DRAINAGE STRUCTURE

CROSS-REFERENCE TO RELATED APPLICATION

This application claims the priority benefit of Taiwan application serial no. 113118604, filed on May 20, 2024. The entirety of the above-mentioned patent application is hereby incorporated by reference herein and made a part of this specification.

BACKGROUND

Technical Field

The disclosure relates to a microphone module.

Description of Related Art

Microphone modules may be disposed outside an object for voice reception. A microphone module includes a sound hole and a microphone. Sound waves from the external environment enter the microphone module through the sound hole and are transmitted to the microphone. Water currents and dust from the external environment also enter the microphone module through the sound hole, affecting the effect of voice reception of the microphone. Specifically, today's microphone modules have poor water drainage effects. As a result, when a water column of high temperature and high pressure enters the microphone module, the microphone is damaged due to the impact of the water column, resulting in the failure of the microphone module.

SUMMARY

The disclosure provides a microphone module to protect a microphone.

A microphone module of the disclosure includes a casing, a microphone, a drainage structure, and a waterproof membrane. The microphone is disposed in the casing. The drainage structure is disposed on the casing. The drainage structure includes a first channel and a second channel connected to each other. A first sound hole and a drainage hole of the first channel are exposed from the casing, and a second sound hole of the second channel corresponds to the microphone. A first normal line of the first sound hole is perpendicular to a second normal line of the second sound hole. The waterproof membrane is disposed on the casing and between the microphone and the second sound hole.

Based on the above, the second sound hole of the second channel of the microphone module of the disclosure corresponds to the microphone and is staggered from the first sound hole of the first channel. The microphone module may guide external water columns and dust through the first channel to exit from the drainage hole, thereby protecting the microphone.

DESCRIPTION OF THE EMBODIMENTS

Figure 1:
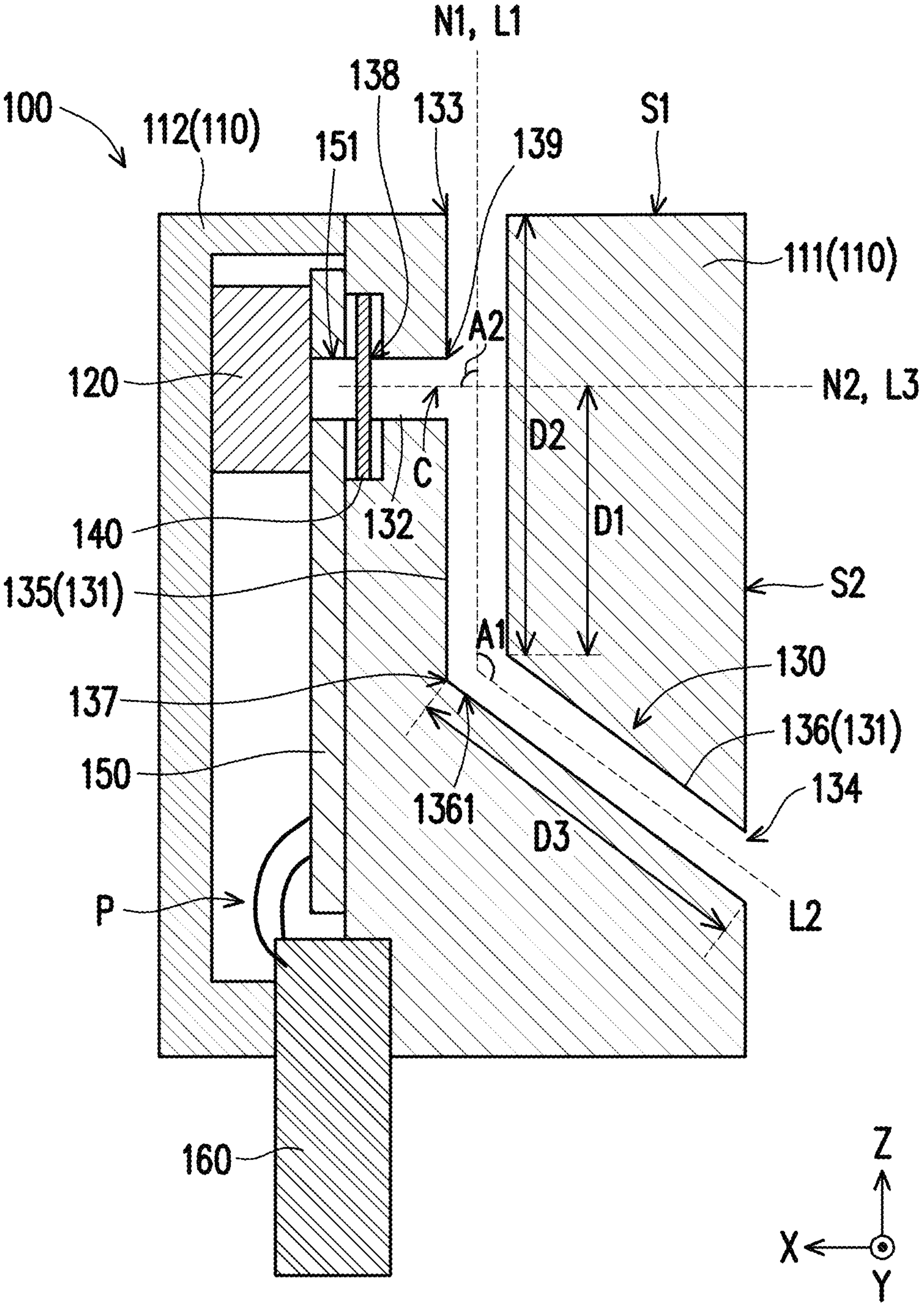
FIG. 1 is a cross-sectional view of a microphone module according to an embodiment of the disclosure.
Figure 2:
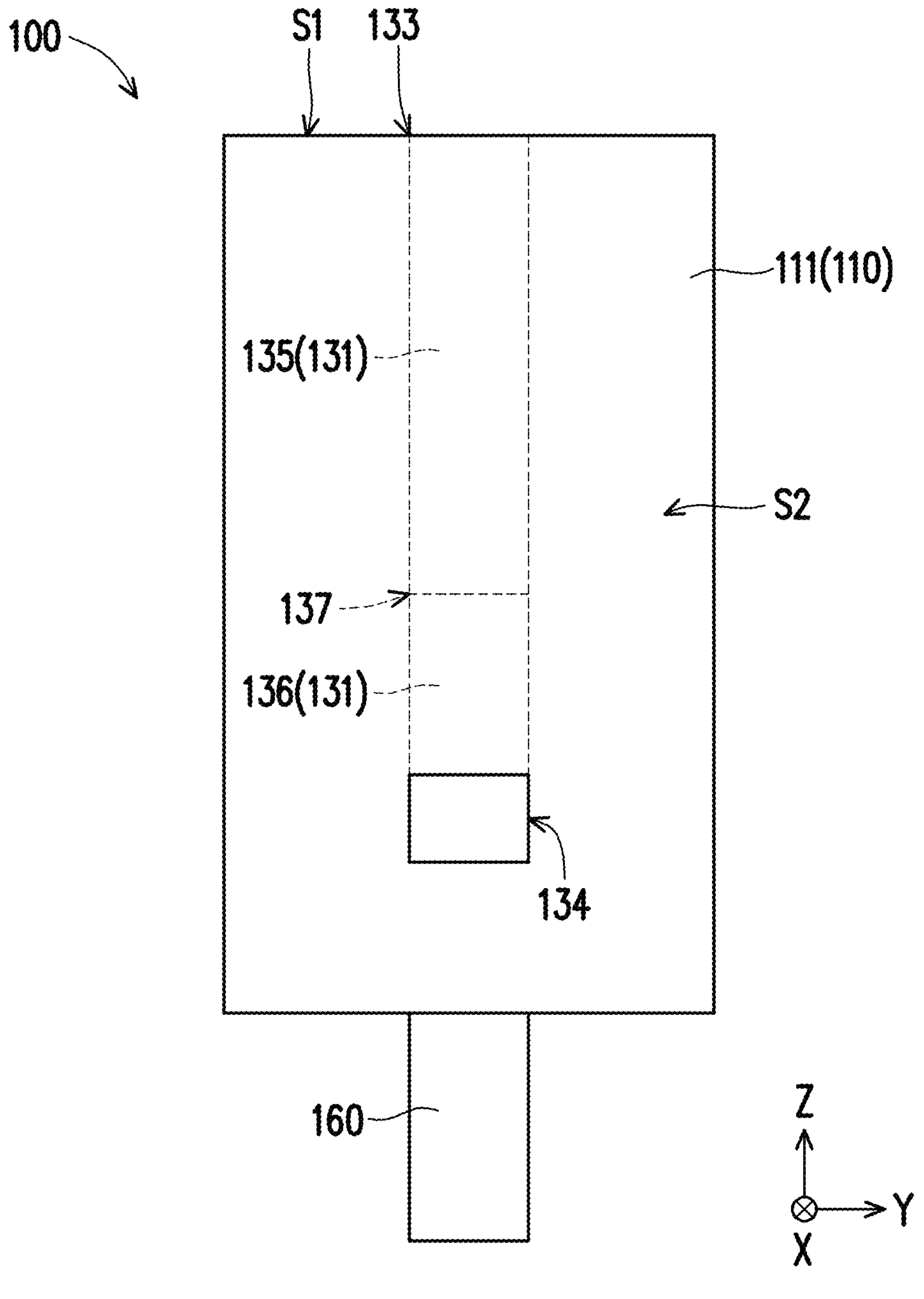
FIG. 2 is a rear view of the microphone module in FIG. 1.
Figure 3:
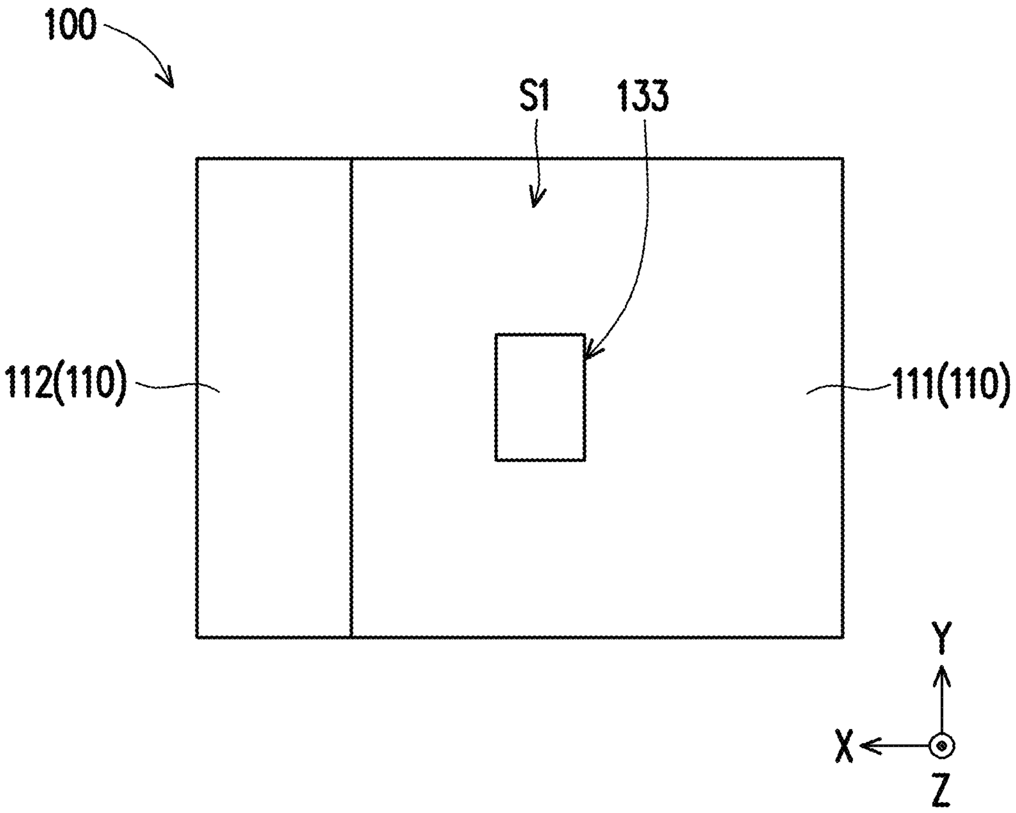
FIG. 3 is a top view of the microphone module in FIG. 1.

FIG. 1 is a cross-sectional view of a microphone module according to an embodiment of the disclosure. FIG. 2 is a rear view of the microphone module in FIG. 1. FIG. 3 is a top view of the microphone module in FIG. 1. A rectangular coordinate X-Y-Z is provided to facilitate the description of components. Referring to FIGS. 1 to 3 at the same time, a microphone module 100 includes a casing 110, a microphone 120, a drainage structure 130, and a waterproof membrane 140. The microphone 120 is disposed in the casing 110. The drainage structure 130 is disposed on the casing 110 and includes a first channel 131 and a second channel 132, which are connected to each other. A first sound hole 133 and a drainage hole 134 of the first channel 131 are exposed from the casing 110. A second sound hole 138 of the second channel 132 corresponds to the microphone 120. The waterproof membrane 140 is disposed on the casing 110 and located between the microphone 120 and the second sound hole 138 to protect the microphone 120.

A first normal line N1 of the first sound hole 133 is perpendicular to a second normal line N2 of the second sound hole 138, causing the first sound hole 133 and the second sound hole 138 to stagger from each other. The first normal line N1 is parallel to a Z-axis, and the second normal line N2 is parallel to an X-axis. The first sound hole 133 and the drainage hole 134 are connected to the external environment. Sound waves from the external environment enter the microphone module 100 through the first sound hole 133. After being transmitted to the second sound hole 138 through the drainage structure 130, the sound waves are transmitted to the microphone 120. Rainwater or dust from the external environment may also enter the microphone module 100 through the first sound hole 133. Since the first sound hole 133 and the second sound hole 138 stagger from each other, when external water columns and dust enter the microphone module 100, the water columns and dust move along the first channel 131 and exit the microphone module 100 through the drainage hole 134 without affecting the microphone 120, allowing the microphone module 100 to maintain a good quality of voice reception. Through the drainage structure 130, the microphone module 100 in this embodiment may achieve a highest rating of IP69K regarding waterproofing and dustproofing.

As shown in FIGS. 1 and 2, the microphone module 100 further includes a circuit board 150 and a circuit assembly 160. The casing 110 includes a first casing 111 and a second casing 112 connected to each other. The material of the first casing 111 and the second casing 112 may be plastic, but is not limited thereto. The second casing 112 and the first casing 111 form a cavity P together. The microphone 120 is located in the cavity P. The first casing 111 of the casing 110 includes a first outer surface S1 and a second outer surface S2, which are connected to each other. The first sound hole 133 is located on the first outer surface S1, and the drainage hole 134 is located on the second outer surface S2. However, the disclosure is not limited thereto. The drainage structure 130 and the waterproof membrane 140 are embedded in the first casing 111. The circuit board 150 is disposed in the cavity P of the casing 110 and located between the waterproof membrane 140 and the microphone 120. The circuit board 150 includes an opening 151 that corresponds to the second sound hole 138. The microphone 120 is connected to the circuit board 150 and covers the opening 151. A diameter of the opening 151 is greater than or equal to 0.6 millimeters. The circuit assembly 160 is at least partially disposed in the cavity P of the casing 110.

The first channel 131 of the drainage structure 130 includes a first portion 135 and a second portion 136, which are connected to each other. The first portion 135 is connected to the first sound hole 133 and the second channel 132 and extends along a first extension axis L1. The first portion 135 intersects the second channel 132 at a first connection end 139 and intersects the second portion 136 at a second connection end 137. The second portion 136 is connected to the drainage hole 134 and extends along a second extension axis L2. The first sound hole 133 and the second connection end 137 are connected to two opposite ends of the first channel 131. The second connection end 137 and the drainage hole 134 are connected to two opposite ends of the second channel 132. In this embodiment, the first extension axis L1 coincides with the first normal line N1 and is parallel to the Z-axis. The second extension axis L2 is different from the first extension axis L1. However, the disclosure is not limited thereto. An included angle A1 is formed between the first extension axis L1 and the second extension axis L2. The included angle A1 is greater than 90 degrees and less than 180 degrees. Thus, the included angle A1 is an obtuse angle.

As shown in FIG. 1, the second channel 132 extends along a third extension axis L3. An angle A2 is formed between the third extension axis L3 and the first normal line N1. The angle A2 may be greater than 0 degrees and less than or equal to 90 degrees. The first connection end 139 and the second sound hole 138 are connected to the opposite ends of the second channel 132. In this embodiment, the third extension axis L3 coincides with the second normal line N2 of the second sound hole 138 and is parallel to the X-axis, but is not limited thereto. That is, an included angle between the second normal line N2 and the third extension axis L3 is zero degrees. The angle A2 between the third extension axis L3 (the second normal line N2) and the first normal line N1 is 90 degrees.

The first connection end 139 is spaced at a distance D1 from the second connection end 137. The distance D1 is greater than or equal to 3 millimeters. Specifically, a center C of the first connection end 139 is spaced at the distance D1 from the second connection end 137. The center C is located on the third extension axis L3. That is, the third extension axis L3 is spaced at the distance D1 from the second connection end 137. When an external high-pressure water column enters the first portion 135 through the first sound hole 133 and impacts a wall surface 1361 of the second portion 136, the distance D1 helps prevent water from flowing back into the second channel 132, thereby protecting the microphone 120.

A combination of a length D2 of the first portion 135 along the first extension axis L1 and a length D3 of the second portion 136 along the second extension axis L2 is less than or equal to 17 millimeters, so as to avoid resonance frequencies that generate standing waves and further affect the quality of voice reception of the microphone module 100. A width of the second channel 132 perpendicular to the third extension axis L3 falls between 2 millimeters and 4 millimeters so as to prevent water from splashing into the second channel 132. As shown in FIGS. 2 and 3, the shapes of the first sound hole 133 and the drainage hole 134 may be rectangular, but are not limited thereto. A width of the first sound hole 133 is preferably between 0.4 millimeters and 2 millimeters to prevent overlarge dust or stones from entering the microphone module 100 through the first sound hole 133. In an unillustrated embodiment, the shapes of the first sound hole 133, the drainage hole 134, and the second sound hole 138 may be circular or any polygonal shape.

Figure 4:
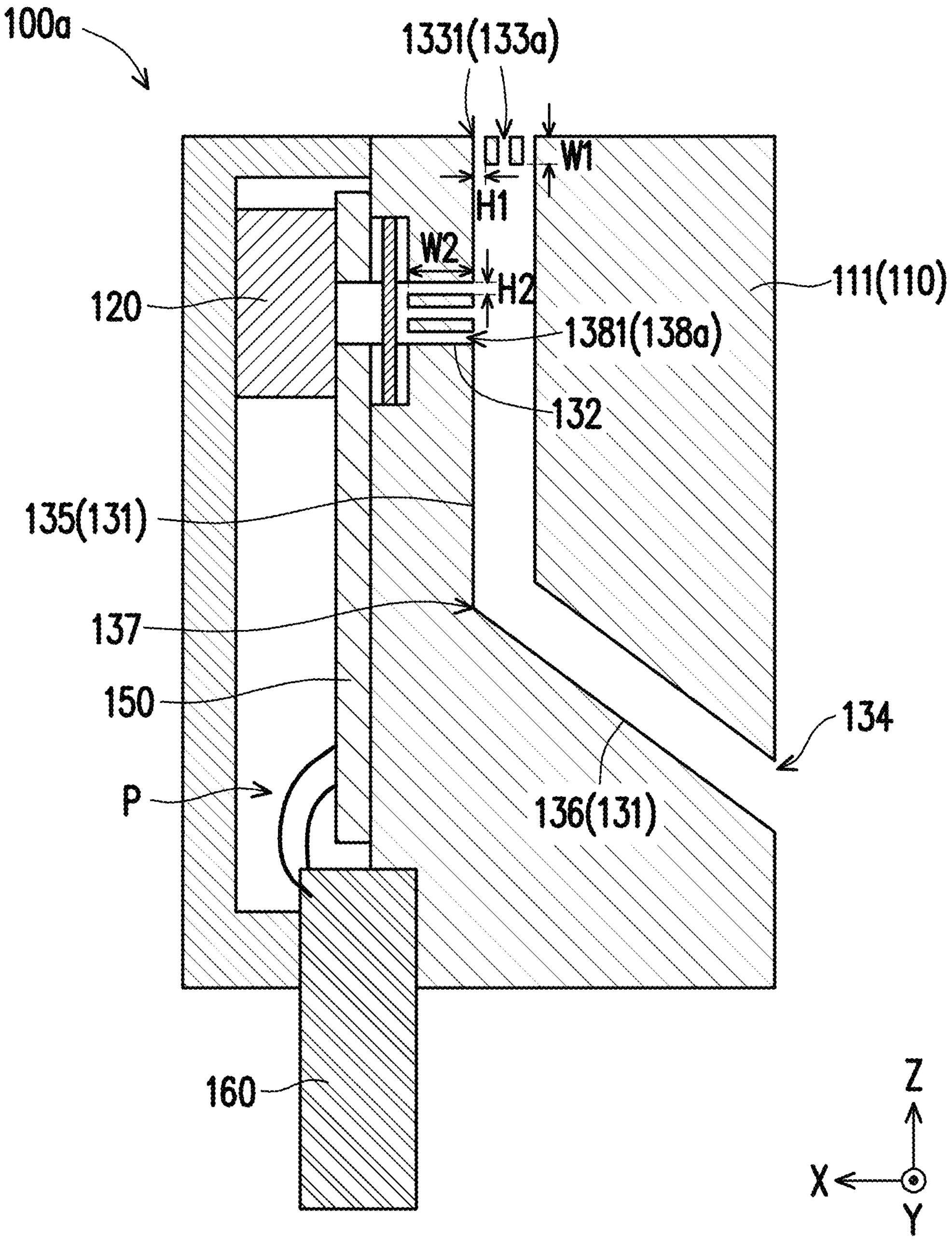
FIG. 4 is a cross-sectional view of a microphone module according to another embodiment of the disclosure.
Figure 5:
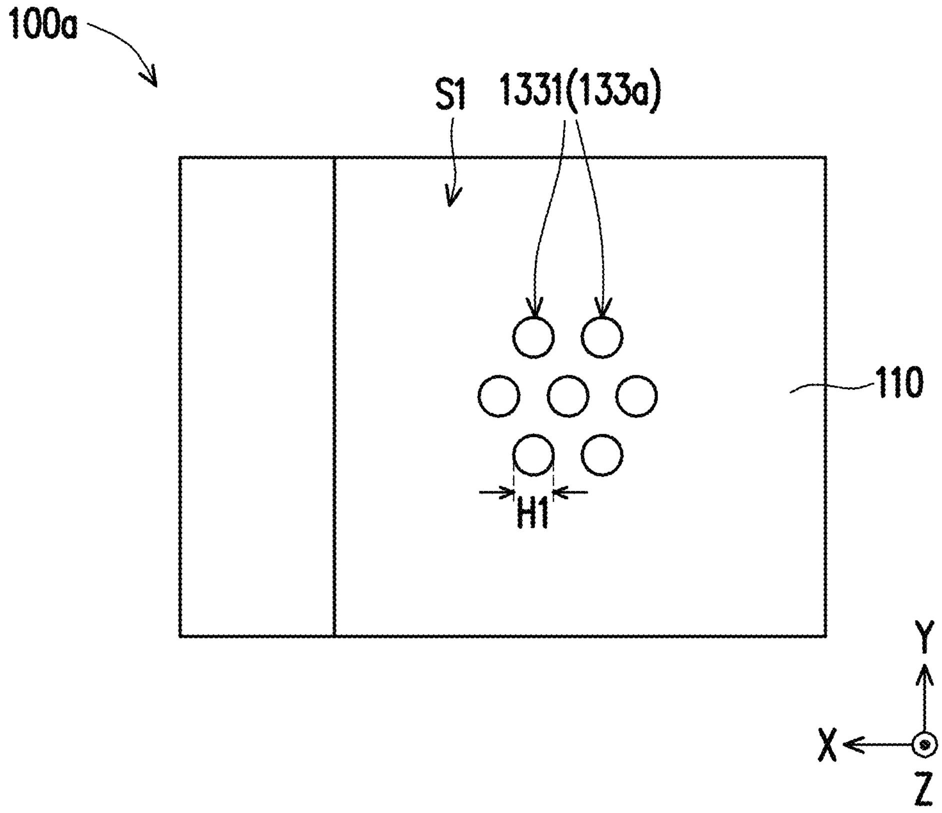
FIG. 5 is a top view of the microphone module in FIG. 4.

FIG. 4 is a cross-sectional view of a microphone module according to another embodiment of the disclosure. FIG. 5 is a top view of the microphone module in FIG. 4. Referring to FIGS. 1, 4, and 5 at the same time, a microphone module 100*a* in this embodiment is similar to the microphone module in the previous embodiment, with the difference being that in this embodiment, a first sound hole 133*a* includes multiple first sub-sound holes 1331, and a second sound hole 138*a* includes multiple second sub-sound holes 1381. A diameter H1 (i.e., a width of the first sub-sound hole 1331 perpendicular to the first normal line N1) of each first sub-sound hole 1331 falls between 0.2 millimeters and 1 millimeter, and a depth W1 (i.e., a length of the first sub-sound hole 1331 along the first normal line N1) of each first sub-sound hole 1331 falls between 0.5 millimeters and 1 millimeter. A diameter H2 (i.e., a width of the second sub-sound hole 1381 perpendicular to the second normal line N2) of each second sub-sound hole 1381 falls between 0.2 millimeters and 1 millimeter, and a depth W2 (i.e., a length of the second sub-sound hole 1381 along the second normal line N2) of each second sub-sound hole 1381 falls between 0.5 millimeters and 1 millimeter. Accordingly, when external water columns pass through the first sound hole 133*a* and the second sound hole 138*a*, the first sub-sound holes 1331 and the second sub-sound holes 1381 reduce the impact force of the water columns, thereby protecting the microphone 120. The microphone module 100*a* in this embodiment has the same effects as the microphone module in the previous embodiment, and further descriptions are not repeated herein.

Figure 6:
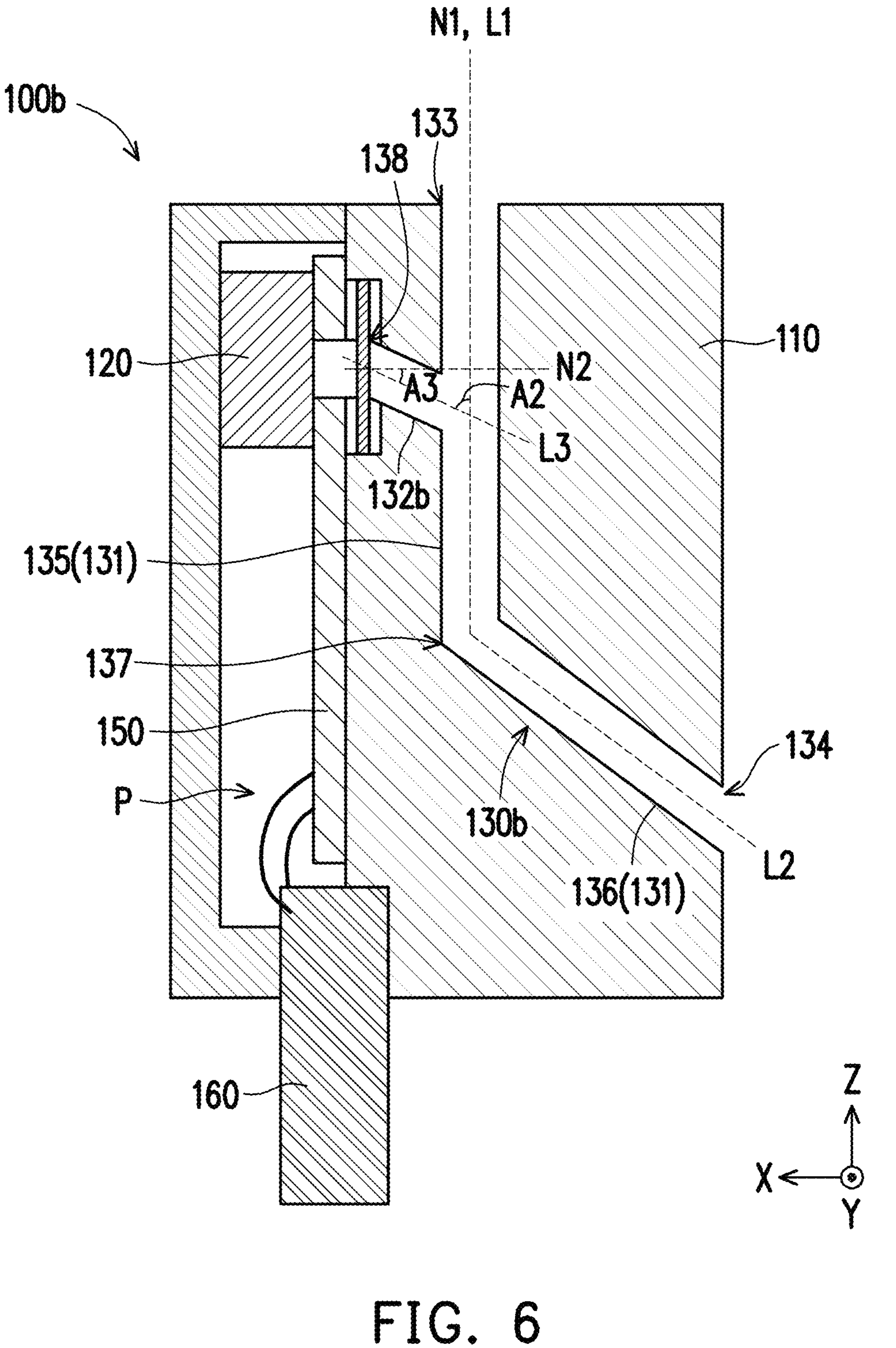
FIG. 6 is a cross-sectional view of a microphone module according to another embodiment of the disclosure.

FIG. 6 is a cross-sectional view of a microphone module according to another embodiment of the disclosure. Referring to FIGS. 1 and 6 at the same time, a microphone module 100*b* in this embodiment is similar to the microphone module in the previous embodiment, with the difference being that in this embodiment, the second normal line N2 of the second sound hole 138 is different from the third extension axis L3 of a second channel 132*b*. An included angle A3 between the second normal line N2 and the third extension axis L3 is greater than 0 degrees and less than 90 degrees. The angle A2 between the third extension axis L3 and the first normal line N1 is greater than 0 degrees and less than 90 degrees. Thus, the angle A2 is an acute angle. Accordingly, when external water columns enter a drainage structure 130*b*, water may further be prevented from flowing into the second sound hole 138 through the second channel 132*b* and damaging the microphone 120. The microphone module 100*b* in this embodiment has the same effects as the microphone module in the previous embodiment, and further descriptions are not repeated herein.

Figure 7:
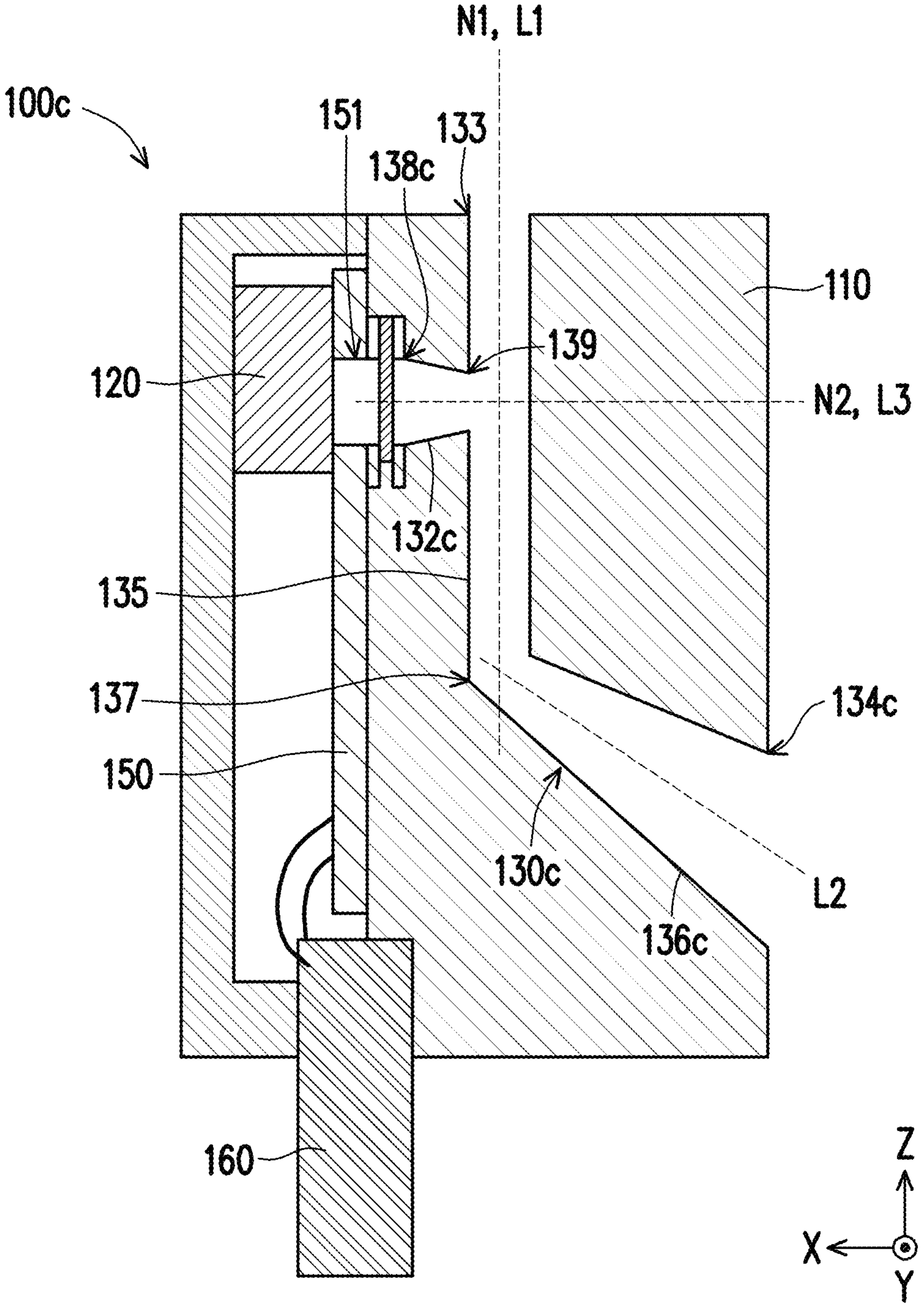
FIG. 7 is a cross-sectional view of a microphone module according to another embodiment of the disclosure.

FIG. 7 is a cross-sectional view of a microphone module according to another embodiment of the disclosure. Referring to FIGS. 1 and 7 at the same time, a microphone module 100*c* in this embodiment is similar to the microphone module in the previous embodiment, with the difference being that in this embodiment, a width of a second portion 136*c* of a drainage structure 130*c* perpendicular to the second extension axis L2 changes along the second extension axis L2. A width of a second channel 132*c* perpendicular to the third extension axis L3 changes along the third extension axis L3. Specifically, the width of the second portion 136*c* gradually increases along the second extension axis L2 from the second connection end 137 to a drainage hole 134*c*, with a width of the second connection end 137 being less than a width of the drainage hole 134*c*. The width of the second channel 132*c* gradually increases along the third extension axis L3 from the first connection end 139 to a second sound hole 138*c*, with a width of the first connection end 139 being less than a width of the second sound hole 138*c*. In an unillustrated embodiment, the width of the second portion 136*c* may gradually increase along the third extension axis L3 from the second sound hole to the first connection end 139, with the width of the second sound hole being less than the width of the first connection end 139. The microphone module 100*c* in this embodiment has the same effects as the microphone module in the previous embodiment, and further descriptions are not repeated herein.

Figure 8:
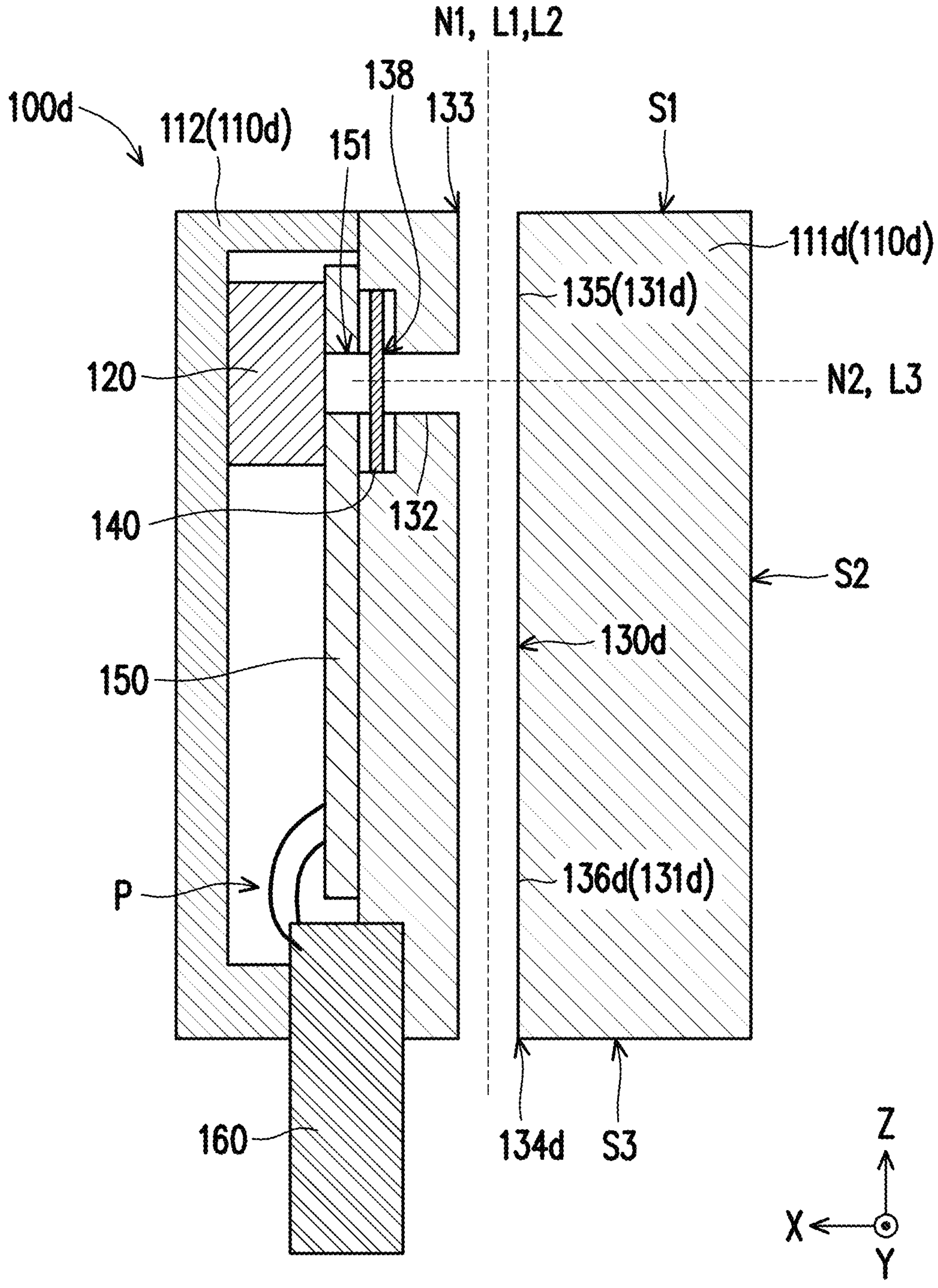
FIG. 8 is a cross-sectional view of a microphone module according to another embodiment of the disclosure.

FIG. 8 is a cross-sectional view of a microphone module according to another embodiment of the disclosure. Referring to FIGS. 1 and 8 at the same time, a microphone module 100*d* in this embodiment is similar to the microphone module in the previous embodiment, with the difference being that in this embodiment, a first channel 131*d* of a drainage structure 130*d* extends along the first normal line N1 of the first sound hole 133, and a drainage hole 134*d* is located on the first normal line N1. In other words, the first normal line N1, the first extension axis L1, and the second extension axis L2 coincide with each other. The included angle between the first extension axis L1 and the second extension axis L2 is 180 degrees. A first casing 111*d* of a casing 110*d* further includes a third outer surface S3. The third outer surface S3 is opposite to the first outer surface S1. The second outer surface S2 is connected between the first outer surface S1 and the third outer surface S3. The first sound hole 133 is located on the first outer surface S1, and the drainage hole 134*d* is located on the third outer surface S3. The microphone module 100*d* in this embodiment has the same effects as the microphone module in the previous embodiment, and further descriptions are not repeated herein.

Figure 9:
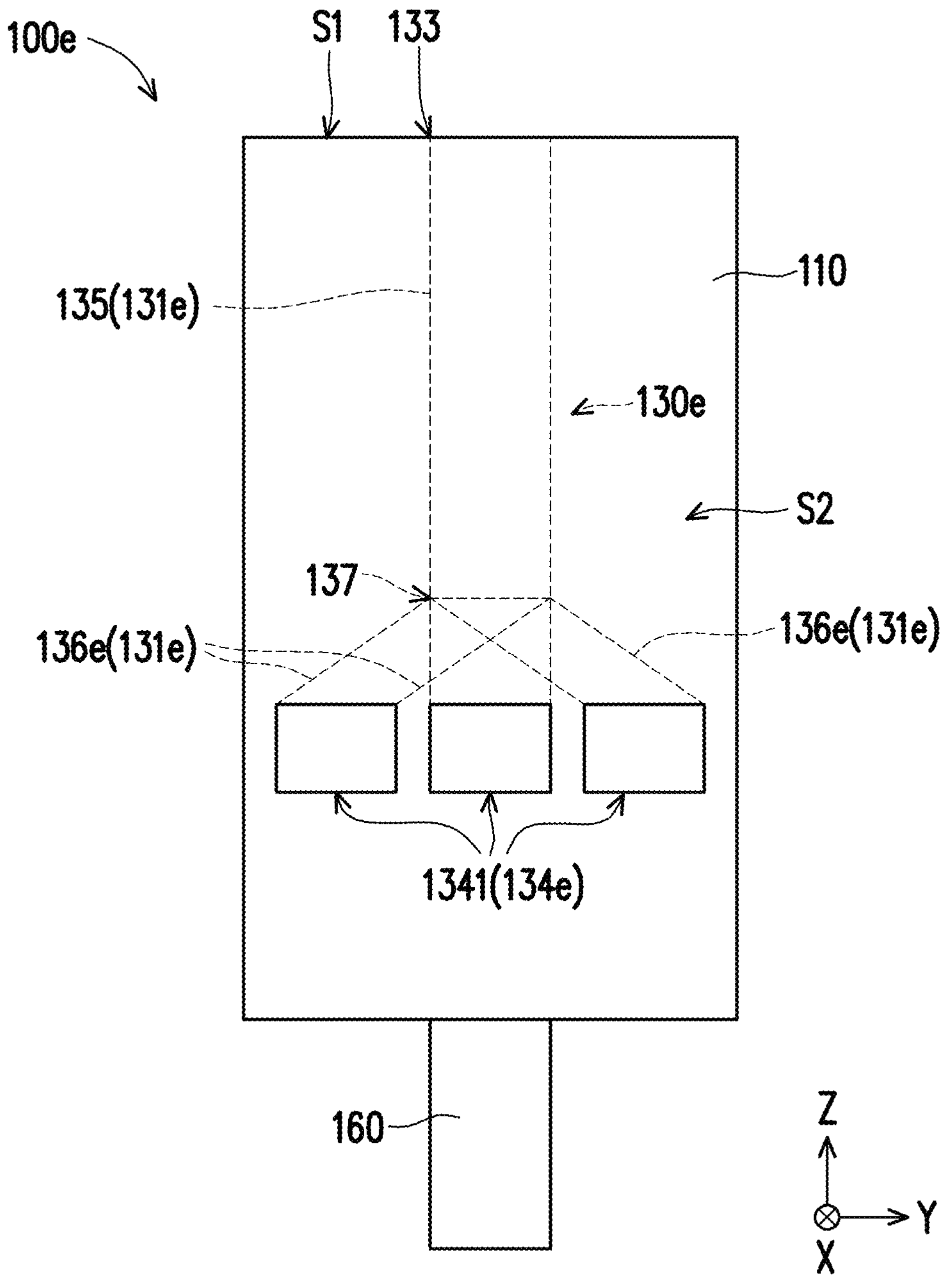
FIG. 9 is a cross-sectional view of a microphone module according to another embodiment of the disclosure.

FIG. 9 is a cross-sectional view of a microphone module according to another embodiment of the disclosure. Referring to FIGS. 2 and 9 at the same time, a microphone module 100*e* in this embodiment is similar to the microphone module in the previous embodiment, with the difference being that in this embodiment, a first channel 131*e* of a drainage structure 130*e* includes multiple second portions 136*e*. A drainage hole 134*e* includes multiple sub-drainage holes 1341. The second portions 136*e* intersect the first portion 135 at the second connection end 137 and are connected to the sub-drainage holes 1341 respectively. The number of the sub-drainage holes 1341 is, for example, three. The number of the second portions 136*e* is, for example, three. However, the disclosure is not limited thereto. A combination of a length of each second portion 136*e* and a length of the first portion 135 is 17 millimeters. The microphone module 100*e* in this embodiment has the same effects as the microphone module in the previous embodiment, and further descriptions are not repeated herein.

The disposition methods of the drainage structures 130, 130*b*, 130*c*, 130*d*, and 130*e* of the microphone modules 100, 100*a*, 100*b*, 100*c*, 100*d*, and 100*e* are not limited to the above embodiments. The structures of the first sound holes 133 and 133*a*, the second sound holes 138 and 138*a*, the second channels 132, 132*b*, and 132*c*, and the second portions 136, 136*c*, 136*d*, and 136*e* may be any combinations of the above embodiments.

In summary, the second sound hole of the second channel of the microphone module of the disclosure corresponds to the microphone and is staggered from the first sound hole of the first channel. The microphone module may guide external water columns and dust through the first channel to exit from the drainage hole, thereby protecting the microphone.

What is claimed is:

1. A microphone module, comprising:

a casing;

a microphone, disposed in the casing;

a drainage structure, disposed on the casing, the drainage structure comprising a first channel and a second channel connected to each other, wherein a first sound hole and a drainage hole of the first channel are exposed from the casing, and a second sound hole of the second channel corresponds to the microphone, wherein a first normal line of the first sound hole is perpendicular to a second normal line of the second sound hole; and a waterproof membrane, disposed on the casing and located between the microphone and the second sound hole, wherein the first channel comprises a first portion and a plurality of second portions, the plurality of second portions intersecting the first portion at a second connection end, wherein the drainage hole comprises a plurality of sub-drainage holes, and the plurality of second portions are connected to the plurality of sub-drainage holes respectively.

2. The microphone module according to claim 1, wherein the first channel comprises a first portion and a second portion connected to each other, the first portion extending along a first extension axis and the second portion extending along a second extension axis, wherein the first portion is connected to the first sound hole and the second channel, the second portion is connected to the drainage hole, and an included angle is formed between the first extension axis and the second extension axis, wherein a combination of a length of the first portion along the first extension axis and a length of the second portion along the second extension axis is less than or equal to 17 millimeters.

3. The microphone module according to claim 1, wherein the first channel comprises a first portion and a second portion connected to each other, the first portion extending along a first extension axis and the second portion extending along a second extension axis, wherein the first portion is connected to the first sound hole and the second channel, the second portion is connected to the drainage hole, and an included angle is formed between the first extension axis and the second extension axis, wherein the first extension axis coincides with the first normal line.

4. The microphone module according to claim 1, wherein the first channel comprises a first portion and a second portion connected to each other, the first portion extending along a first extension axis and the second portion extending along a second extension axis, wherein the first portion is connected to the first sound hole and the second channel, the second portion is connected to the drainage hole, and an included angle is formed between the first extension axis and the second extension axis, wherein the included angle is greater than 90 degrees and less than or equal to 180 degrees.

5. The microphone module according to claim 1, wherein the first channel comprises a first portion and a second portion connected to each other, the first portion extending along a first extension axis and the second portion extending along a second extension axis, wherein the first portion is connected to the first sound hole and the second channel, the second portion is connected to the drainage hole, and an included angle is formed between the first extension axis and the second extension axis, wherein a width of the second portion perpendicular to the second extension axis changes along the second extension axis.

6. The microphone module according to claim 1, wherein the second channel extends along a third extension axis, and an angle is formed between the third extension axis and the first normal line, the angle being less than or equal to 90 degrees.

7. The microphone module according to claim 6, wherein the second normal line is different from the third extension axis, and an included angle between the second normal line and the third extension axis is less than 90 degrees.

8. The microphone module according to claim 6, wherein a width of the second channel perpendicular to the third extension axis changes along the third extension axis.

9. The microphone module according to claim 1, wherein the casing comprises a first outer surface and a second outer surface connected to each other, wherein the first sound hole is located on the first outer surface, and the drainage hole is located on the second outer surface.

10. The microphone module according to claim 1, wherein the first sound hole comprises a plurality of first sub-sound holes, each of the first sub-sound holes having a diameter between 0.2 millimeters and 1 millimeter and a depth between 0.5 millimeters and 1 millimeter.

11. The microphone module according to claim 1, wherein the second sound hole comprises a plurality of second sub-sound holes, each of the second sub-sound holes having a diameter between 0.2 millimeters and 1 millimeter and a depth between 0.5 millimeters and 1 millimeter.

12. The microphone module according to claim 1, wherein the first channel extends along the first normal line, and the drainage hole is located on the first normal line.

13. The microphone module according to claim 1, wherein the casing comprises a first outer surface and a third outer surface opposite to each other, wherein the first sound hole is located on the first outer surface, and the drainage hole is located on the third outer surface.

14. The microphone module according to claim 1, further comprising a circuit board, wherein the circuit board is disposed in the casing and located between the waterproof membrane and the microphone, and the circuit board comprises an opening, the opening corresponding to the second sound hole, wherein the microphone is connected to the circuit board and covers the opening.

15. The microphone module according to claim 1, further comprising a circuit assembly and a circuit board, wherein the circuit board is disposed in the casing, and the circuit assembly is at least partially disposed in the casing.

16. The microphone module according to claim 1, wherein the casing comprises a first casing and a second casing connected to each other, the second casing and the first casing forming a cavity together, wherein the drainage structure and the waterproof membrane is embedded in the first casing, and the microphone is located in the cavity.

17. The microphone module according to claim 1, wherein the first channel comprises a first portion and a second portion connected to each other, the first portion extending along a first extension axis and the second portion extending along a second extension axis, wherein the first portion is connected to the first sound hole and the second channel, the second portion is connected to the drainage hole, and an included angle is formed between the first extension axis and the second extension axis, wherein the first portion intersects the second channel at a first connection end, the first portion intersects the second portion at a second connection end, and a distance is provided between the first connection end and the second connection end, the distance being greater than or equal to 3 millimeters.

* * * * *